Nov. 11, 1924.
W. C. BUCKNAM
1,514,650
BLOWPIPE APPARATUS
Filed Oct. 8, 1923
4 Sheets-Sheet 3
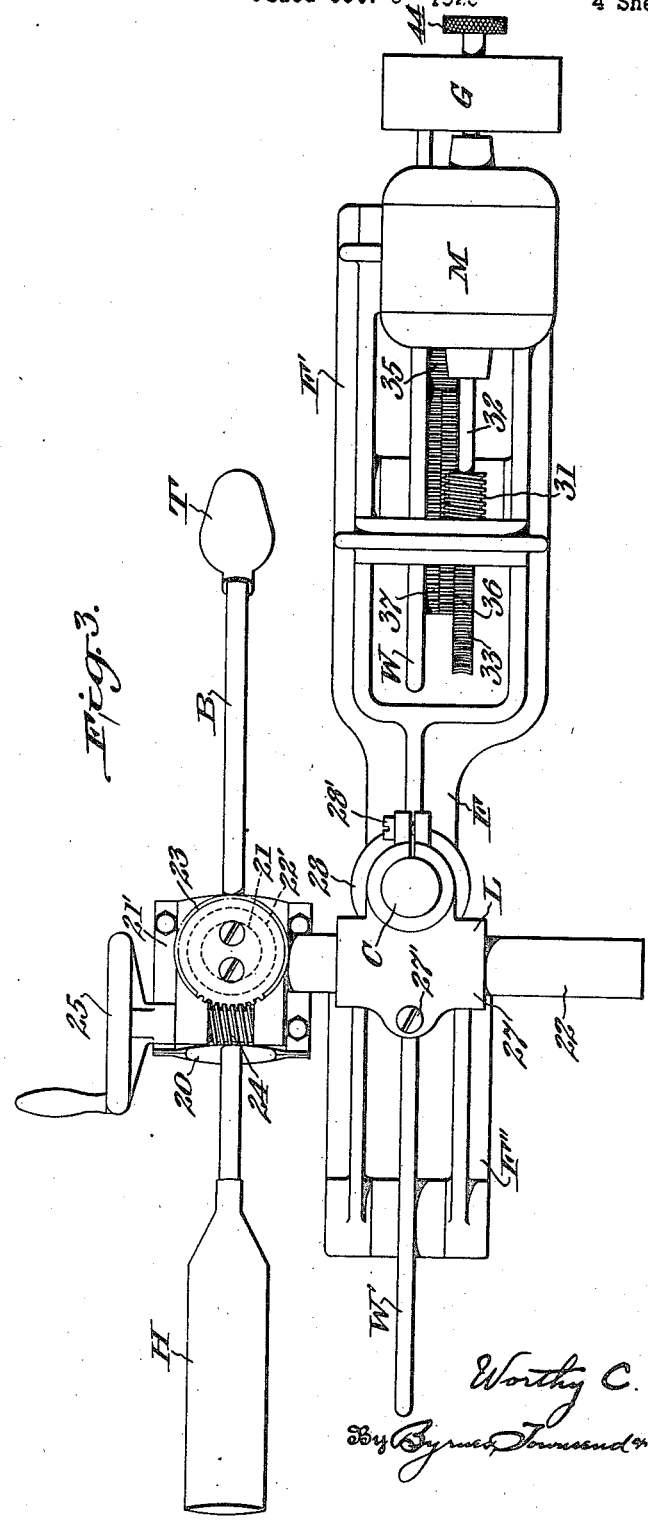

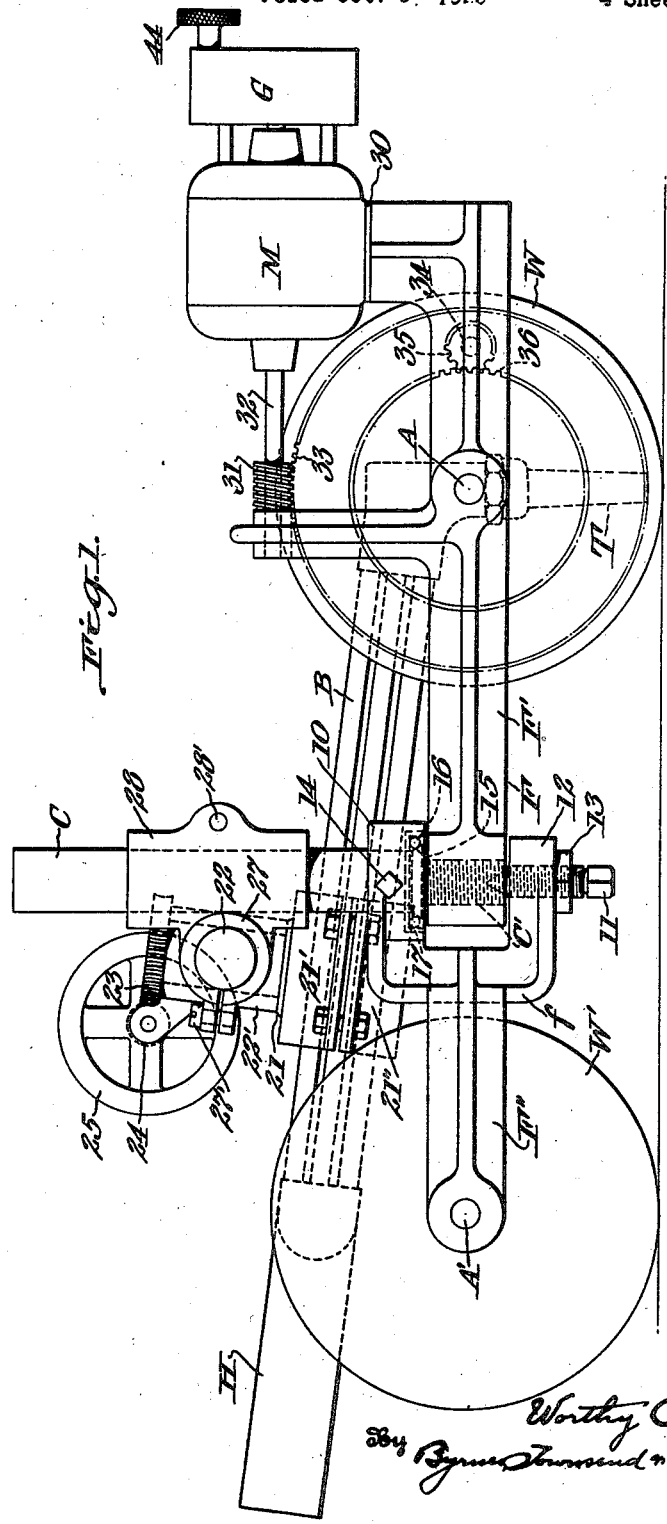

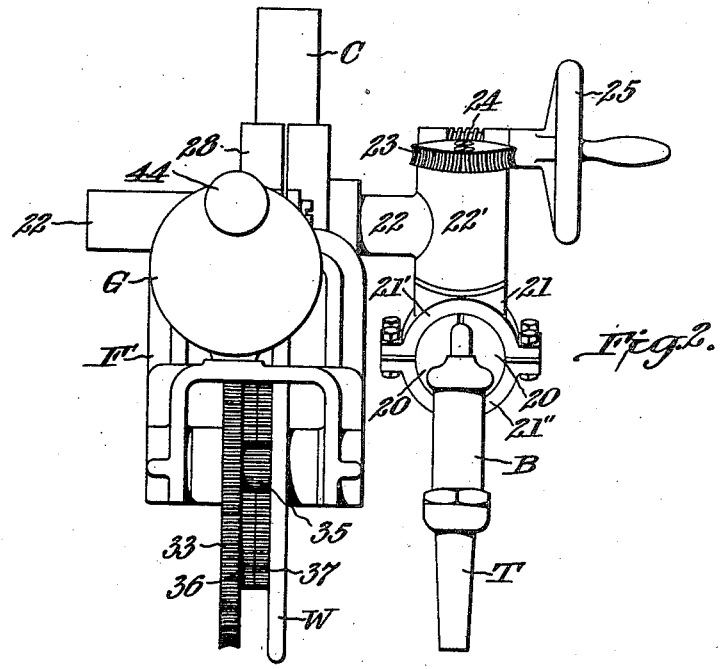
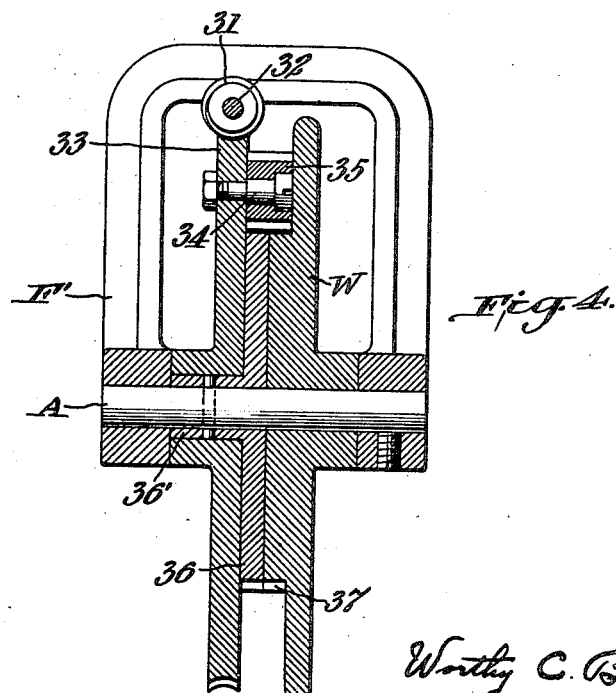

Nov. 11, 1924.
W. C. BUCKNAM
1,514,650
BLOWPIPE APPARATUS
Filed Oct. 8, 1923
4 Sheets-Sheet 4
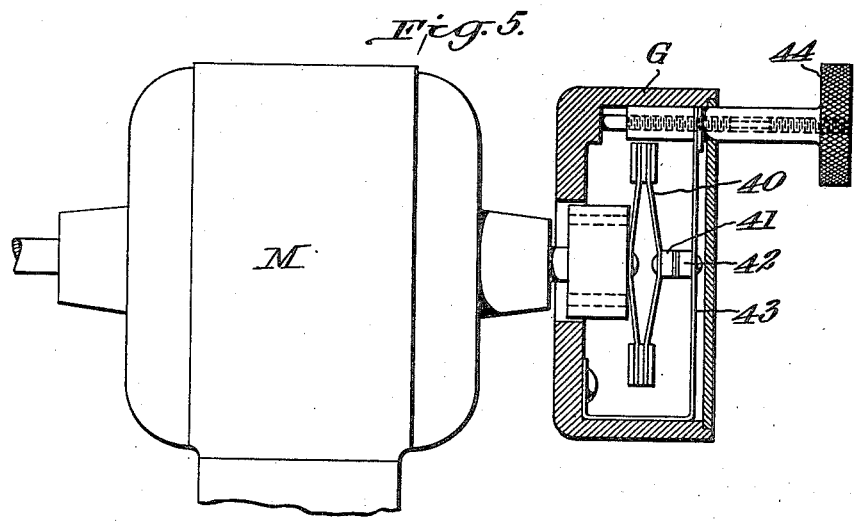
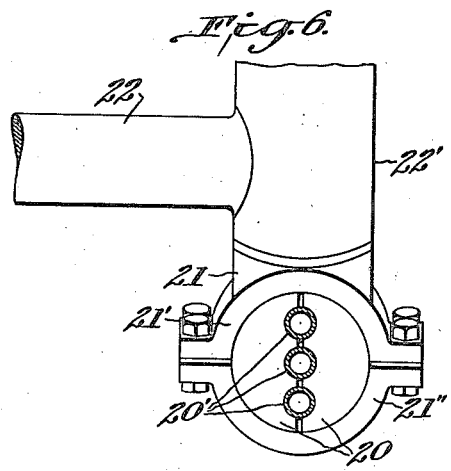

Patented Nov. 11, 1924.

1,514,650

UNITED STATES PATENT OFFICE.

WORTHY C. BUCKNAM, OF FREEPORT, NEW YORK, ASSIGNOR TO THE LINDE AIR PRODUCTS COMPANY, A CORPORATION OF OHIO.

BLOWPIPE APPARATUS.

Application filed October 8, 1923. Serial No. 667,433.

*To all whom it may concern:*

Be it known that I, WORTHY C. BUCKNAM, a citizen of the United States, residing at Freeport, in the county of Nassau and State of New York, have invented certain new and useful Improvements in Blowpipe Apparatus, of which the following is a specification.

This invention relates to welding and cutting apparatus and particularly to an improved wheeled carrier for blowpipes adapted for welding and cutting metals by means of oxy-acetylene and similar flames.

Wheeled blowpipe carriers, as heretofore constructed, have been provided with two wheels on the same axle, and in some cases one or more additional wheels have been provided to render the carrier self-supporting. Such carriers are impractical for some classes of work because they usually require comparatively wide spaces to work in or special tracks.

An important object of this invention is to provide a simple and light motor-driven wheeled blowpipe carrier that is arranged to carry any standard make of hand cutting or welding blowpipe at a desirable welding or cutting speed along a comparatively narrow path without a special track. Another object of the invention is to provide a two-wheeled blowpipe carrier which may be driven at a substantially uniform speed and guided as desired in a fixed direction or in changing directions and easily maintained in balance by an operator.

The above and other objects and the novel features of this invention will be apparent from the following description taken with the drawings, in which—

Figs. 1, 2 and 3 are, respectively, a side view, a front end view, and a plan view of a blowpipe carrier embodying this invention, and Figs. 4, 5 and 6 are, respectively, detail views of the speed reduction gearing, motor controlling means and blowpipe clamping means employed in the improved apparatus.

Referring to the drawings, the carrier comprises a main elongated frame F that is supported for movement along the work solely by wheels, such as tandem wheels W, W' of the same diameter, arranged substantially symmetrically with respect to a vertical plane passing longitudinally and substantially centrally through the carrier frame. Propelling means, such as an electric motor M on the frame may be connected through a suitable speed reduction gearing to one of the wheels, desirably the front wheel W, to propel the carrier and the blowpipe B thereon along the work. The blowpipe may be secured to its supporting carriage by a suitable clamping means that is adapted to hold any standard hand cutting or welding blowpipe, the clamping means being so arranged that the blowpipe may be adjustable to any angular position relatively to the work. When the blowpipe is clamped in position on the carrier, its handle H may be arranged to be held by an operator to steady the carrier on its supporting wheels and guide the apparatus while it is being driven along the work by the motor M.

It is desirable that the carrier shall be so constructed that it may travel along a straight or curved line or may follow an irregular line defined by some desired pattern. Accordingly, the frame of the carrier is jointed between its ends and as shown consists of front and rear members F' and F'' coupled together on a common vertical axis so that these members may swing out of line with one another while wheels W, W' respectively supporting these members may travel upon the surface of the work or adjacent thereto. As shown, the frame members F', F'' are forked and the wheels W, W' are mounted on axles A, A', respectively, supported in the limbs of the forked portions of these frame members. The coupling between the frame members may be of any suitable construction that will render these members relatively adjustable about the axis of the coupling to position the supporting wheels in alignment or at an angle to one another. As shown, the rear end of the frame member F' extends between limbs of a fork *f* at the front end of the frame member F'' and has the lower threaded end C' of a blowpipe supporting column C secured to it. The column C projects upwardly through a vertical opening in the upper limb 10 of the fork *f*. The upper pointed end of an adjusting screw 11, projecting through the lower limb 12 and held in place by a lock nut 13, may engage in a central socket in the lower end of the column C to provide a bearing therefor to pivotally support the rear end of the frame F' in the fork f. Means, such as a set screw 14 in the limb 10, may engage the column C to rigidly secure the members F' and F" together as a unit in line or at an angle to one another for cutting along a straight or curved line. When the carrier is to be used for cutting or welding along an irregular line the set screw 14 is unfastened so that, in following a pattern with the front wheel W or other suitable guide on the front frame member F', the latter may freely swing relatively to the rear member F" about the axis of the column C. In order to reduce the friction and facilitate such swinging, the column is provided with an inclined shoulder 15 adapted to engage ball bearings 16 in a ball race 17 in the inner side of the limb 10.

The blowpipe B, which has the usual tip T and handle H and may be of any standard make adapted to be used by hand independently of a carrier for cutting or welding metals, is adjustably mounted on the column C by suitable mechanism to permit the blowpipe tip to be set at any angle relatively to the work and in any position relatively to the carrier. A suitable blowpipe holder supports the blowpipe intermediate its ends so that it may be turned about its longitudinal axis to set the tip T to produce a cut having a vertical or a bevelled edge, or to weld along such edges. As shown the blowpipe holder may consist of two semi-cylindrical plates 20 having mating grooves 20' to receive and grip the three gas tubes of a common type of blowpipe. The plates 20 fit in the inverted saddle 21' at the lower end of a head 21 and are held in place by a corresponding saddle 21" secured to the head 21. The head 21 is rotatably mounted in a bearing 22' at the end of an arm 22 and its upper end carries a worm wheel 23 which meshes with a worm 24 rotatable by a hand wheel 25 so that the head 21 and blowpipe may be turned about an upright axis to set the tip at the desired distance from the carrier. The cross bar 22 extends through horizontal jaws 27 of a clamp L whose vertical jaws 28 fit the column C, these jaws being respectively clamped to the bar 22 and the column C by screws 27' and 28'. Thus the blowpipe supporting arm 22 may be raised and lowered upon the column C and moved inwardly and outwardly through the clamp 27 to set the blowpipe in a large number of different positions relatively to the carrier. Moreover, since the blowpipe is carried by the column C which is secured to the front frame member, the tip T remains in a fixed position relatively to the front wheel W and will cut or weld along a line parallel to the path of the latter which may be guided by the handle H or by a suitable handle secured to the front frame member F'.

While the carrier may be manually propelled and guided along the work by the operator holding the handle H, it is practically impossible for an operator to obtain substantially uniform speeds as required for different classes of work, and therefore it is more desirable that the carrier be motor-driven and guided as well as balanced manually by the operator holding the handle H. An electric motor M mounted in a saddle 30 at the front end of the frame member F' may be operatively connected, as through suitable speed reduction gearing, to the front wheel W. In the reduction gearing shown, a worm 31 on the motor shaft 32 meshes with a worm wheel 33 rotatable on the axle A. A stub shaft 34 secured near the periphery of the worm wheel 33 carries a rotatable pinion 35 that is adapted to mesh with the differential spur gears 36 and 37. The gear 36 is held against rotation, as by having its hub 36' secured to the axle A, and the gear 37 is rigidly secured to the front wheel W which is freely rotatable on the axle A. The first speed reduction is through the worm 31 and worm wheel 33 and the second speed reduction is obtained through the difference in the number of teeth on the spur gears 36 and 37,—for example, the former may be provided with 100 teeth and the latter may have 99 teeth, whereby a 100 to 1 speed reduction may be obtained at this point.

The electric motor M is desirably an automatically controlled variable speed motor whereby the rate of travel of the carrier and blowpipe may be varied as desired within wide limits. As illustrated in Fig. 5, the motor speed may be automatically controlled and kept substantially uniform in a well known manner by a suitable speed responsive spring-and-weight governor 40 on the motor armature shaft, which carries a contact 41. The motor circuit includes the contact 41 and also a contact 42 which it is adapted to engage, the latter being carried by a finger 43 that may be adjusted to obtain the desired motor speed by turning a thumb screw 44 in the governor housing G.

The operation of the improved blowpipe carrier will be readily understood from the foregoing description. The torch may be supported longitudinally of the carrier at one side of the plane through the tandem wheels W, W' and the motor and gearing are desirably supported so that practically their entire weight or at least the principal part of it is at the other side of that plane to assist in counterbalancing the weight of the blowpipe and parts of its support and thereby provide a more evenly balanced construction and one in which the operator who guides the device from the handle H may easily hold the carrier in upright position and balance. The tip T of the blowpipe is desirably positioned so that its axis lies approximately in a plane through the axle A and at one side of the front wheel W. The apparatus may be used for cutting and welding along straight and irregular lines and, being self-propelled and portable, requires little labor to operate it and may readily be taken from place to place and used in many kinds of metal welding and cutting operations.

While the carrier, in its preferred construction, comprises two similar tandem wheels W, W' as its sole supporting means while travelling along the work, it will be understood that a pair of wheels may be substituted for each or either of these wheels in some cases, and various other changes may be made in the details of construction as herein disclosed without departing from the invention as defined in the appended claims.

I claim:

1. In blowpipe apparatus, a blowpipe carrier comprising relatively adjustable front and rear frame members, blowpipe supporting means mounted on said carrier, and means for moving said carrier along the work.

2. In blowpipe apparatus, the combination of a carrier comprising relatively adjustable front and rear frame members, and guiding means for said carrier comprising a handle connected to one of said members.

3. In portable welding and cutting apparatus, the combination of a carrier comprising front and rear frame members coupled together and relatively adjustable about the axis of said coupling, and a blowpipe secured to said front member and having a handle constituting a means for manually guiding said carrier.

4. In blowpipe apparatus, the combination of a frame, a blowpipe mounted thereon, and a pair of tandem wheels constituting the sole mechanical means for supporting said frame and blowpipe for movement along the work.

5. In blowpipe apparatus, the combination of a frame, blowpipe carrying means thereon, front and rear wheels for said frame constituting the sole mechanical means for supporting said frame and said carrying means, and means comprising a handle mounted on said frame for guiding the same along the work.

6. In blowpipe apparatus, the combination of a carrier comprising relatively adjustable front and rear frame members, supporting wheels therefor, and a blowpipe mounted on said carrier and having a handle for guiding the same and said blowpipe in straight, curved or irregular directions along the work.

7. In blowpipe apparatus, the combination of a carrier comprising an elongated frame, front and rear supporting wheels therefor substantially symmetrical with respect to a vertical longitudinal plane through said frame, means on said frame for propelling the carrier, and means comprising a handle for manually guiding said carrier along the work.

8. In blowpipe apparatus, the combination of a carrier comprising a frame, supporting means therefor substantially symmetrical with respect to a vertical plane extending longitudinally of said frame, a blowpipe mounted on said frame at one side of said plane and having a handle for manually guiding said carrier, and a propelling motor mounted on said frame so that at least the principal part of its weight is disposed at the other side of said plane to assist in counterbalancing the weight of said blowpipe.

9. In blowpipe apparatus, the combination of a carrier comprising an elongated frame, front and rear wheels constituting the sole mechanical supporting means therefor, such wheels being substantially symmetrical with respect to a vertical plane extending longitudinally through said frame, a blowpipe entirely mounted on said frame at one side of said plane and a propelling motor mounted on said frame so that at least the principal part of its weight is disposed at the other side of said plane.

10. In blowpipe apparatus, the combination of a carrier comprising adjustably connected frame members, tandem supporting wheels therefor substantially symmetrical with respect to a vertical plane extending longitudinally through said members when they are adjusted in line, a blowpipe mounted on said carrier at one side of said plane and having a handle for manually guiding said carrier along the work, and a propelling motor geared to one of said wheels and mounted on said carrier so that at least the principal part of its weight and that of such gearing is disposed at the other side of said plane to assist in counterbalancing the weight of said blowpipe and parts of its mounting means.

11. A blowpipe carrier comprising the combination of a frame, tandem supporting wheels therefor, and blowpipe supporting means on said frame between said wheels.

12. A blowpipe carrier comprising the combination of front and rear frame members, means for coupling such members together, and means for mounting a blowpipe on such coupling means.

13. A blowpipe carrier comprising the combination of front and rear frame members, and adjustable coupling means therefor whereby such members may assume any one of various positions relatively to one another.

14. The invention defined in claim 13 in which said coupling means comprises means whereby said frame members may be rigidly connected together.

15. A blowpipe carrier comprising the combination of front and rear frame members, means including a column for coupling said members together, and blowpipe supporting means carried by said column.

16. A blowpipe carrier comprising the combination of a frame, tandem supporting wheels therefor, blowpipe supporting means carried by said frame, and a propelling motor supported by said frame and operatively connected to one of said wheels.

17. In a blowpipe carrier, the combination of a frame, a column thereon, and blowpipe supporting means on said column comprising an arm adjustable lengthwise and transversely of said column, and adjustable blowpipe holding means on said arm.

18. In a blowpipe carrier, the combination of a frame, wheels for supporting the same, blowpipe holding means on said frame, a propelling motor on said frame, and reduction gearing operatively connecting said motor to one of said wheels, such gearing comprising a worm on the motor shaft, a worm wheel driven thereby and coaxial with the driven supporting wheel, a rotatable pinion carried by said worm wheel, a non-rotatable gear meshing with said pinion, and a gear secured to said supporting wheel and also meshing with said pinion.

In testimony whereof, I affix my signature.

WORTHY C. BUCKNAM.